US00RE38079E

(19) United States
(12) Reissued Patent
Washino et al.

(10) Patent Number: US RE38,079 E
(45) **Date of Reissued Patent: *Apr. 15, 2003**

(54) MULTI-FORMAT AUDIO/VIDEO PRODUCTION SYSTEM

(75) Inventors: Kinya Washino, Dumont, NJ (US); Barry H. Schwab, West Bloomfield, MI (US)

(73) Assignee: Muti-Format, Inc., Teterboro, NJ (US)

( * ) Notice: This patent issued on a continued prosecution application filed under 37 CFR 1.53(d), and is subject to the twenty year patent term provisions of 35 U.S.C. 154(a)(2).

This patent is subject to a terminal disclaimer.

(21) Appl. No.: 09/113,615

(22) Filed: Jul. 10, 1998

Related U.S. Patent Documents

Reissue of:
(64) Patent No.: 5,537,157
Issued: Jul. 16, 1996
Appl. No.: 08/298,104
Filed: Aug. 30, 1994

U.S. Applications:

(63) Continuation-in-part of application No. 08/050,861, filed on Apr. 21, 1993.

(51) Int. Cl.[7] ..... H04N 5/46; H04N 7/01

(52) U.S. Cl. ..... 348/722; 348/445; 348/554; 348/556; 348/911

(58) Field of Search ..... 348/445, 554, 348/584, 556, 722, 441, 911, 449, 854, 555, 558, 527, 524; 386/4, 39, 34, 131, 124, 96, 104, 123, 37, 1, 46; H04N 5/46, 7/01, 5/262, 5/253, 3/36

(56) References Cited

U.S. PATENT DOCUMENTS 3,617,626 A * 11/1971 Bluth ..... 348/445

(List continued on next page.)

FOREIGN PATENT DOCUMENTS

| | | | | |
|---|---|---|---|---|
| EP | 314873 | * | 5/1989 | ..... H04N/5/46 |
| EP | 514012 | * | 11/1992 | ..... H04N/7/01 |
| JP | 4-37846 | * | 2/1992 | ..... H04N/5/253 |
| WO | 015586 | * | 8/1993 | ..... H04N/7/01 |
| WO | WO 93/23954 | * | 11/1993 | ..... H04N/7/01 |
| WO | 94/01971 | * | 1/1994 | ..... H04N/7/01 |

OTHER PUBLICATIONS

M. Adams; "Network Design and Implementation of a Large–Scale, ATM, Multimedia Network," Time Warner Cable, Dec. 1994.

(List continued on next page.)

*Primary Examiner*—David E. Harvey
(74) *Attorney, Agent, or Firm*—Gifford, Krass, Groh, Sprinkle, Anderson & Citowski, PC

(57) ABSTRACT

An audio/video production system facilitates professional quality image manipulation and editing using an enhanced general-purpose hardware. A program input may be translated into any of a variety of graphics or television formats, including NTSC, PAL, SECAM and HDTV, and stored as data-compressed images, using any of several commercially available methods such as Motion JPEG, MPEG, etc. While being processed, the images may be re-sized to produce a desired aspect ratio or dimensions using conventional techniques such as pixel interpolation. Frame rate conversion to and from conventional formats is performed by using the techniques employed for film-to-NTSC and film-to-PAL transfers, or by inter-frame interpolation, all well known in the art. By judicious selection of the optimal digitizing parameters, the system allows a user to establish an interrelated family of aspect ratios, resolutions, and frame rates, yet remain compatible with currently available and planned graphics and television formats.

34 Claims, 7 Drawing Sheets

U.S. PATENT DOCUMENTS

| | | | | | |
|---|---|---|---|---|---|
| 3,882,539 | A | | 5/1975 | Faroudja | 360/11 |
| 4,357,624 | A | * | 11/1982 | Greenberg | 386/4 |
| 4,633,293 | A | * | 12/1986 | Powers | 348/441 |
| 4,936,816 | A | | 6/1990 | Blumle et al. | 493/183 |
| 4,982,280 | A | | 1/1991 | Lyon et al. | 358/105 |
| 4,998,167 | A | | 3/1991 | Jaqua | 358/140 |
| 5,027,206 | A | | 6/1991 | Vreeswijk | 358/141 |
| 5,045,932 | A | * | 9/1991 | Sharman et al. | 358/527 |
| 5,111,292 | A | | 5/1992 | Kuriacose et al. | 358/133 |
| 5,221,966 | A | | 6/1993 | Clayton et al. | 358/140 |
| 5,243,433 | A | * | 9/1993 | Harley | 348/445 |
| 5,291,280 | A | | 3/1994 | Faroudia et al. | 348/416 |
| 5,317,398 | A | | 5/1994 | Casavant et al. | 348/570 |
| 5,327,235 | A | * | 7/1994 | Richards | 348/441 |
| 5,329,309 | A | * | 7/1994 | Dorricott et al. | 348/584 |
| 5,331,346 | A | | 7/1994 | Shields et al. | 348/441 |
| 5,337,154 | A | | 8/1994 | Dorricott et al. | 348/448 |
| 5,365,273 | A | | 11/1994 | Correa et al. | 348/452 |
| 5,384,598 | A | | 1/1995 | Rodriguez et al. | 348/441 |
| 5,444,491 | A | | 8/1995 | Lim | 348/441 |
| 5,446,497 | A | | 8/1995 | Keating et al. | 348/443 |
| 5,461,420 | A | | 10/1995 | Yonemitsu et al. | 348/401 |
| 5,517,248 | A | | 5/1996 | Isoda | 348/459 |
| 5,519,438 | A | | 5/1996 | Elliott et al. | 348/441 |
| 5,532,749 | A | | 7/1996 | Hong | 348/441 |
| 5,563,660 | A | | 10/1996 | Tsukagoshi | 348/384 |
| 5,565,998 | A | | 10/1996 | Coombs et al. | 386/46 |
| 5,594,552 | A | | 1/1997 | Fujinami et al. | 386/131 |
| 5,600,377 | A | | 2/1997 | David et al. | 348/441 |
| 5,606,539 | A | | 2/1997 | De Haan et al. | 369/59 |
| 5,608,464 | A | | 3/1997 | Woodham | 348/441 |
| 5,617,218 | A | | 4/1997 | Rhodes | 348/441 |
| 5,649,048 | A | * | 7/1997 | Tomita et al. | 386/131 |
| 5,666,461 | A | | 9/1997 | Igarashi et al. | 386/95 |
| 5,724,101 | A | | 3/1998 | Haskin | 348/441 |
| 5,742,351 | A | | 4/1998 | Guede | 348/459 |
| 5,754,248 | A | * | 5/1998 | Faroudja | 386/123 |
| 5,768,469 | A | | 6/1998 | Yagasaki et al. | 386/109 |
| 5,771,073 | A | | 6/1998 | Lim | 348/441 |
| 5,812,204 | A | | 9/1998 | Baker et al. | 348/441 |
| 5,832,085 | A | | 11/1998 | Inoue et al. | 348/441 |
| 5,835,150 | A | | 11/1998 | Choi | 348/441 |
| 5,835,672 | A | | 11/1998 | Yagasaki et al. | 386/111 |
| 5,838,381 | A | | 11/1998 | Kasahara et al. | 348/441 |
| 5,930,445 | A | * | 7/1999 | Peters et al. | 386/131 |
| 5,999,220 | A | * | 12/1999 | Washino | 348/441 |

OTHER PUBLICATIONS

D.J. Bancroft, "Pixels and Halide—A Natural Partnership?," SMPTE Journal May 1994, pp. 306–311.

D. Bancroft, Technology Council of the Motion Picture—Televison Industry Newsletter, Oct. 1993.

M. Adams, "5/96 WHITE PAPER—A Broadband Interactive Cable Gateway," May 1996. 14 pages.

R. Brown J. Callahan, "5/95 WHITE PAPER Software Architecture for Broadband CATV Interactive Systems," May 1995, 14 pages.

G. Demos, "An Example of Hierarchy of Formats for HDTV", SMPTE Journal, Sep. 1992, pp. 609–617.*

J.S. Lim, "A Proposal for an HDTV/ATV Standard with Multiple Transmission Formats", SMPTE Journal, Aug. 1993, pp/. 699–702.*

W.E. Bret1, "3XNTSC—A 'Leapfrog' Production Standard for HDTV", SMPTE Journal, Mar. 1989, pp. 173–178.*

B.Hunt, G. Kennel, L.DeMarsh,S.Kristy, High–Resolution Electronic Intermediate System for Motion–Picture Film, SMPTE Journal, Mar. 1991, pp. 156–161.*

A.Kaiser,H.W.Mahler, R.H.McMann, "Resolution Requirements for HDTV Based Upon the Performance of 35mm Motion–Picture Films for Theatrical Viewing", SMPTE Journal, Jun. 1985, pp. 654–659.*

Y. Ide,M.Sasuga,N.Harada,T.Nishizawa, "A Three–CCD HDTV Color Camera", SMPTE Journal, Jul. 1990, pp. 532–537.*

G.Reitmeier,C. Carlson,E.Geiger,D.Westerkamp, "The Digital Hierarchy—A Blueprint for television in the 21st Century", SMPTE Journal, Jul. 1992, pp. 466–470.*

L.J.Thorpe,T.Hanabusa, "If Progressive Scanning is So Good, How Bad is Interlace?", SMPTE Journal, Dec. 1990, pp. 972–986.*

* cited by examiner 210
212
214
DATA
220
INTERFACE
218
DIGITAL TUNER
222
DECOMPRESSION PROCESSOR
232
ROM
230
RAM
226
DATA BUS
242
GRAPHICS PROCESSOR
244
ANALOG / COMPOSITE VIDEO OUTPUTS
MICRO-PROCESSOR
228
INTERFACE BUS CONTROLLER
234
INTERNAL HARD DISK
236
TAPE BACK-UP
240
REMOVABLE HARD DISK
238

MULTI-FORMAT AUDIO/VIDEO PRODUCTION SYSTEM

Matter enclosed in heavy brackets [ ] appears in the original patent but forms no part of this reissue specification; matter printed in italics indicates the additions made by reissue.

REFERENCE TO RELATED APPLICATIONS

This application is a continuation-in-part of U.S. patent application Ser. No. 08/050,861, filed Apr. 21, 1993.

FIELD OF THE INVENTION

This invention relates generally to video production, photographic image processing, and computer graphics design, and, more particularly, to a multi-format video production system capable of professional quality editing and manipulation of images intended for television and other applications, including HDTV programs.

BACKGROUND OF THE INVENTION

As the number of television channels available through various program delivery methods (cable TV, home video, broadcast, etc.) continues to proliferate, the demand for programming, particularly high-quality HDTV-format programming, presents special challenges, both technical and financial, to program producers. While the price of professional editing and image manipulation equipment continues to increase, due to the high cost of research and development and other factors, general-purpose hardware, including personal computers, can produce remarkable effects at a cost well within the reach of non-professionals, even novices. As a result, the distinction between these two classifications of equipment has become less well defined.

The parent to this application, for example, describes a video production system which integrates equipment supplied by various manufacturers, enabling a consumer to produce and edit video material using an enhanced personal computer. An adapter unit interfaced to each camera in use with the system connects to a camera interface module, and each camera interface module, in turn, feeds a computer interface unit. These computer interface units communicate with a personal computer over a standard interconnect, allowing an operator to control the various cameras while viewing individual video programs which appear in separate "windows" on the computer monitor.

This related invention solves many of the problems associated with combining commercially available hardware to create an economical personal-computer-based system capable of very high quality audio/video production. However, the variety of available and planned program standards and delivery methods places further demands on video production equipment, including the editing and manipulation of images not only from a variety of sources, but in differing pixel formats, frame rates, and so forth. Although general-purpose PC-based equipment may never allow professional-style rendering of images at full resolution in real-time, each new generation of microprocessors enables progressively faster, higher-resolution applications. In addition, as the price of memory circuits and other data storage hardware continues to fall, the capacity of such devices has risen dramatically, thereby improving the prospects for enhancing PC-based image manipulation systems for such applications.

In terms of dedicated equipment, attention has traditionally focused on the development of two kinds of professional image-manipulation systems: those intended for the highest quality levels to support film effects, and those intended for television broadcast to provide "full 35 mm theatrical film quality," within the realities and economics of present broadcasting systems. Conventional thinking holds that 35 mm theatrical film quality is equivalent to 1200 or more lines of resolution, whereas camera negatives present 2500 or more lines. As a result, image formats under consideration have been directed towards video systems having 2500 or more scan lines for high-level production (such as the Kodak "Electronic Intermediate" system described by Hunt et al.), with hierarchies of production, HDTV broadcast, and NTSC and PAL compatible standards which are derived by down-converting these formats. Several techniques have been described, including those of Bretyl ("3×NTSC 'Leapfrog' Production Standard for HDTV", SMPTE Journal, March 1989), Demos ("An Example Hierarchy of Formats for HDTV", SMPTE Journal, September 1992), and Lim ("A Proposal for an HDTV/ATV Standard with Multiple Transmission Formats", SMPTE Journal, August 1993). Most proposals employ progressive scanning, although interlace is considered an acceptable alternative as part of an evolutionary process. In particular, Demos addresses the important issue of compatibility to computer-graphics-compatible formats, although he begins with an 1152-line format, and only considers progressive scanning. And, as pointed out by Thorpe et al., progressive scanning also has drawbacks, and as shown by Kaiser et al. ("Resolution Requirements for HDTV Based Upon the Performance of 35 mm Motion-Picture Films for Theatrical Viewing", SMPTE Journal, June 1985), even 35 mm theatrical film quality is a misnomer since the realities of mechanical projection systems restrict the typical screen display to less than 700 TV lines/picture height.

Current technology directions in computers and image processing should allow production equipment based upon fewer than 1200 scan lines, with picture expansions to create a hierarchy of upward-converted formats for theatrical projection, film effects, and film recording. In addition general-purpose hardware enhancements should be capable of addressing the economic aspects of production, a subject not considered in detail by any of the available references.

SUMMARY OF THE INVENTION

The present invention takes advantage of general-purpose hardware where possible to provide an economical multi-format video production system. In the preferred embodiment, specialized graphics processing capabilities are included in a high-performance personal computer or workstation, enabling the user to edit and manipulate an input video program and produce an output version of the program in a final format which may have a different frame rate, pixel dimensions, or both. An internal production format is chosen which provides the greatest compatibility with existing and planned formats associated with standard and widescreen television, high-definition television, and film. For compatibility with film, the frame rate of the internal production format is preferably 24 fps. Images are re-sized by the system to larger or smaller dimensions so as to fill the particular needs of individual applications, and frame rates are adapted by inter-frame interpolation or by traditional schemes, including "3:2 pull-down" for 24-to-30 fps conversions, or by manipulating the frame rate itself for 24 to 25 fps for a PAL-compatible display. The enhancement to a general-purpose platform preferably takes the form of a graphics processor connected to receive a video signal in an input format. The processor comprises a plurality of interface units, including a standard/widescreen interface unit operative to convert the video program in the input format into an output signal representative of a standard/widescreen formatted image, and output the signal to an attached display device. A high-definition television interface unit is operative to convert the video program in the input format into an output signal representative of an HDTV-formatted image, and output the signal to the display device. A centralized controller in operative communication with the video program input, the graphics processor, and an operator interface, enables commands entered by an operator to cause the graphics processor to perform one or more of the conversions using the television interfaces. The present invention thus encourages production at relatively low pixel dimensions to make use of lower-cost general-purpose hardware and to maintain high signal-to-noise, then subsequently expands the result into a higher-format final program. This is in contrast to competing approaches, which recommend operating at higher resolution, then down-sizing, if necessary, to less expensive formats which has led to the high-cost, dedicated hardware, the need for which the present invention seeks to eliminate.

DETAILED DESCRIPTION OF THE PREFERRED EMBODIMENT

Figure 1A:
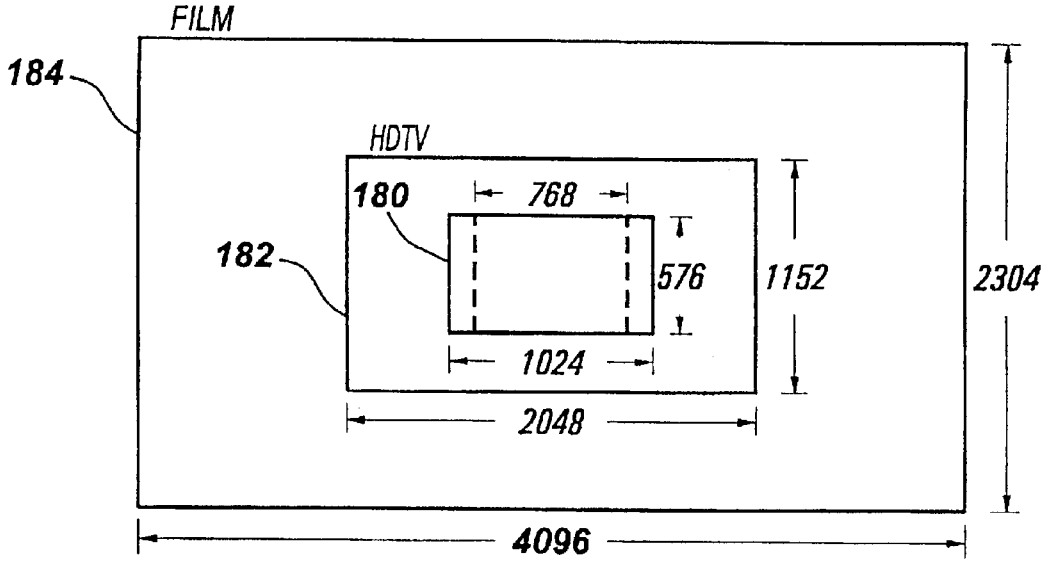
FIGS. 1A–1D show the preferred and alternative image aspect ratios in pixels.

The present invention builds upon and extends certain of the concepts introduced in the parent to this application, "Personal-Computer-Based Video Production System." Ser. No. 08/050,861 filed Apr. 21, 1993. The system described in that application allows an operator to control equipment supplied by various manufacturers at a centralized personal computer to produce, edit and record a video program. Each camera to be used with the system described in this previously filed application feeds a signal to the personal computer through a custom adapter unit, cable and camera interface module the latter containing cable compensation and gain circuitry. The interface modules feed a common video switcher, audio mixer and display means, all of which may be provided by a variety of sources, including different manufacturers. In the preferred embodiment, the display is the monitor of a programmed personal computer, and computer interface modules connected between each camera interface module and the computer allow video images generated by the cameras to appear in different windows on the computer monitor. Control signals entered at the computer are routed to the cameras in order to control their functioning.

The present invention is primarily concerned with a different but related aspect of facilitating professional quality audio/video production; namely, the conversion of disparate graphics or television formats, including requisite frame-rate conversions, to establish an interrelated family of aspect ratios, resolutions, and frame rates, while remaining compatible with available and future graphics/TV formats. These formats include images of pixel dimensions capable of being displayed on currently available multi-scan computer monitors, and custom hardware will be described whereby frames of higher pixel-count beyond the capabilities of these monitors may be viewed. Images are re-sized by the system to larger or smaller dimensions so as to fill the particular needs of individual applications, and frame rates are adapted by inter-frame interpolation or by traditional schemes such as using "3:2 pull-down" (for 24 to 30 frame-per-second film-to-NTSC conversions) or by speeding up the frame rate itself (as for 24 to 25 fps for PAL television display). The resizing operations may involve preservation of the image aspect ratio, or may change the aspect ratio by "cropping" certain areas, by performing non-linear transformations, such as "squeezing" the picture, or by changing the vision center for "panning," "scanning" and so forth. Inasmuch as film is often referred to as "the universal format," primarily because 35-mm film equipment is standardized and used throughout the world, the preferred internal or "production" frame rate is preferably 24 fps. This selection also has an additional benefit, in that the 24 fps rate allows the implementation of cameras having greater sensitivity than at 30 fps, which is even more critical in systems using progressive scanning, for which the rate will be 48 fields per second vs. 60 fields per second in some other proposed systems.

The image dimensions chosen allow the use of conventional CCD-type cameras, but the use of digital processing directly through the entire signal chain is preferred, and this is implemented by replacing the typical analog RGB processing circuitry with fully digital circuitry. Production effects may be conducted in whatever image size is appropriate, and then re-sized for recording. Images are recorded by writing the digital data to storage devices employing removable hard-disk drives, disk drives with removable media, optical or magneto-optical based drives, or tape-based drives, preferably in compressed-data form. As data rates for image processing and reading-from or writing-to disk drives increase, many processes that currently require several seconds will soon become attainable in real-time, which will eliminate the need to record film frames at slower rates. Other production effects, such as slow-motion or fast-motion may be incorporated, and it is only the frame rates of these effects that are limited in any way by the technology of the day. In particular, techniques such as non-linear-editing, animation, and special-effects will benefit from the implementation of this system. In terms of audio, the data rate requirements are largely a function of sound quality. The audio signals may be handled separately, as in an "interlocked" or synchronized system for production, or the audio data may be interleaved within the video data stream. The method selected will depend on the type of production manipulations desired, and by the limitations of the current technology.

Although a wide variety of video formats and apparatus configurations are applicable to the present invention, the system will be described in terms of the alternatives most compatible with currently available equipment and methods. FIG. 1A illustrates one example of a compatible system of image sizes and pixel dimensions. The selected frame rate is preferably 24 per second (2:1 interlaced), for compatibility with film elements; the selected picture dimension in pixels is preferably 1024×576 (0.5625 Mpxl), for compatibility with the 16:9 "widescreen" aspect ratio anticipated for all HDTV systems, and the conventional 4:3 aspect ratio used for PAL systems [768×576 (0.421875 Mpxl)]. All implementations preferably rely on square pixels, though other pixel shapes may be used. Re-sizing (using the well known, sophisticated sampling techniques available in many image-manipulation software packages or, alternatively, using hardware circuitry described herein below) to 2048×1152 (2.25 Mpxl) provides an image suitable for HDTV displays or even theatrical projection systems, and a further re-sizing to 4096×2304 (9.0 Mpxl) is appropriate for even the most demanding production effects. Images may be data compressed 5:1 for 16:9 "wide-screen" TV frames, or 10:1 for HDTV; the data files may then be stored on conventional disk drives, requiring only approximately 8.1 MB/sec for wide-screen frames in RGB, and only 16.1 MB/sec for HDTV frames in RGB.

Figure 1B:
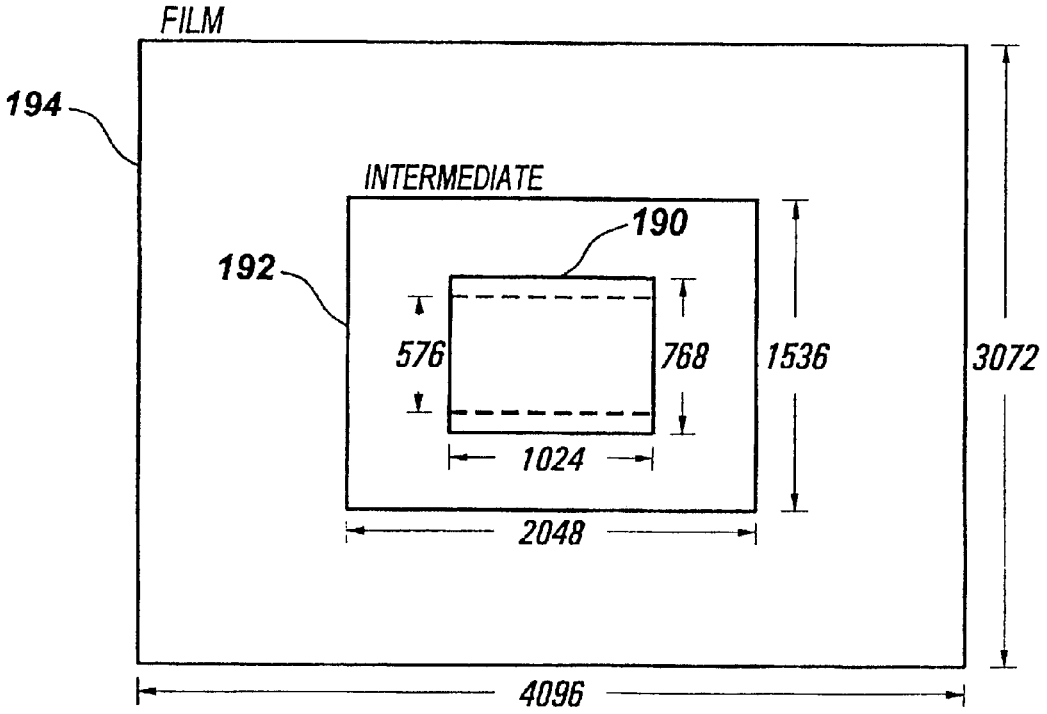

An alternative embodiment of the invention is shown in FIG. 1B. In this case, the user would follow a technique commonly used in film production, in which the film is exposed as a 4:3 aspect ratio image. When projected as a wide-screen format image, the upper and lower areas of the frame may be blocked by an aperture plate, so that the image shows the desired aspect ratio (typically 1.85:1 or 1.66:1). If the original image format were recorded at 24 frames per second, with a 4:3 ratio and with a dimension in pixels of 1024×768, all image manipulations would preserve these dimensions. Complete compatibility with the existing formats would result, with NTSC and PAL images produced directly from these images by re-scaling, and the aforementioned wide-screen images would be provided by excluding 96 rows of pixels from the top of the image and 96 rows of pixels from the bottom of the image, resulting in the 1024×576 image size as disclosed above. The data content of each of these frames would be 0.75 Mpxls, and the data storage requirements disclosed above would be affected accordingly.

Figure 1C:
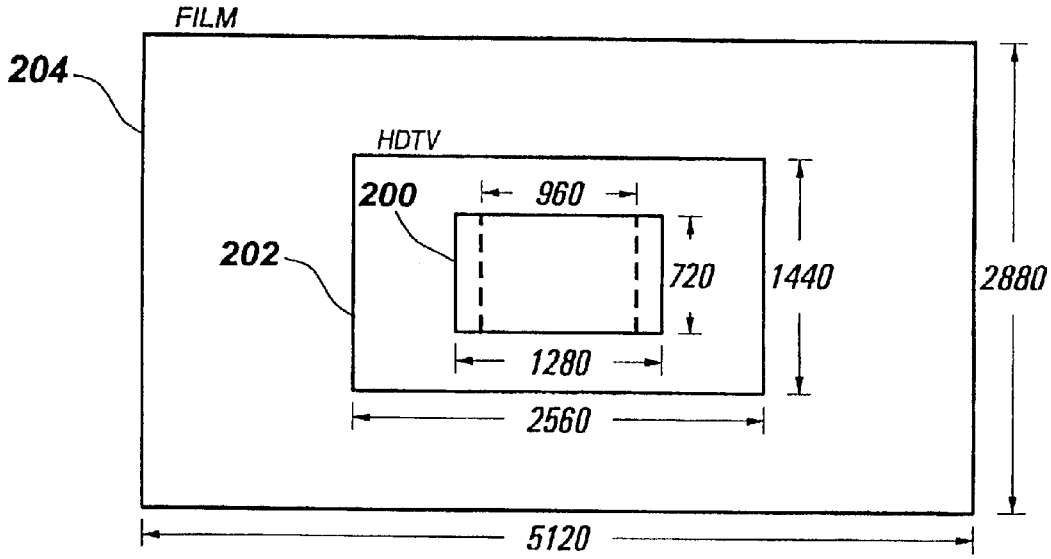

Another embodiment of the invention is depicted in FIG. 1C. In this alternative, the system would follow the image dimensions suggested in several proposed digital HDTV formats under consideration by the Advanced Television Study Committee of the Federal Communications Commission. The format to be adopted is expected to assume a wide-screen image having dimensions of 1280×720 pixels. Using these image dimensions (but at 24 fps with 2:1 interlace), compatibility with the existing formats would be available, with NTSC and PAL images derived from this frame size by excluding 160 columns of pixels from each side of the image, thereby resulting in an image having a dimension in pixels of 960×720. This new image would then be re-scaled to produce images having pixel dimensions of 640×480 for NTSC, or 768×576 for PAL; the corresponding wide-screen formats would be 854×480 and 1024×576, respectively. In this case, an image having a dimension in pixels of 1280×720 would contain 0.87890625 Mpxl, with 1,000 TV lines of resolution; furthermore, the systems under evaluation by the ATSC of the FCC also assume a decimation of the two chrominance signals, with detail of only 640×360 pixels retained. The data storage requirements disclosed above would be affected accordingly. The development path to 24 fps with progressive scanning is both well-defined and practical, as is the use of the previously described methods to produce images having a dimension in pixels of 2048×1152.

Figure 1D:
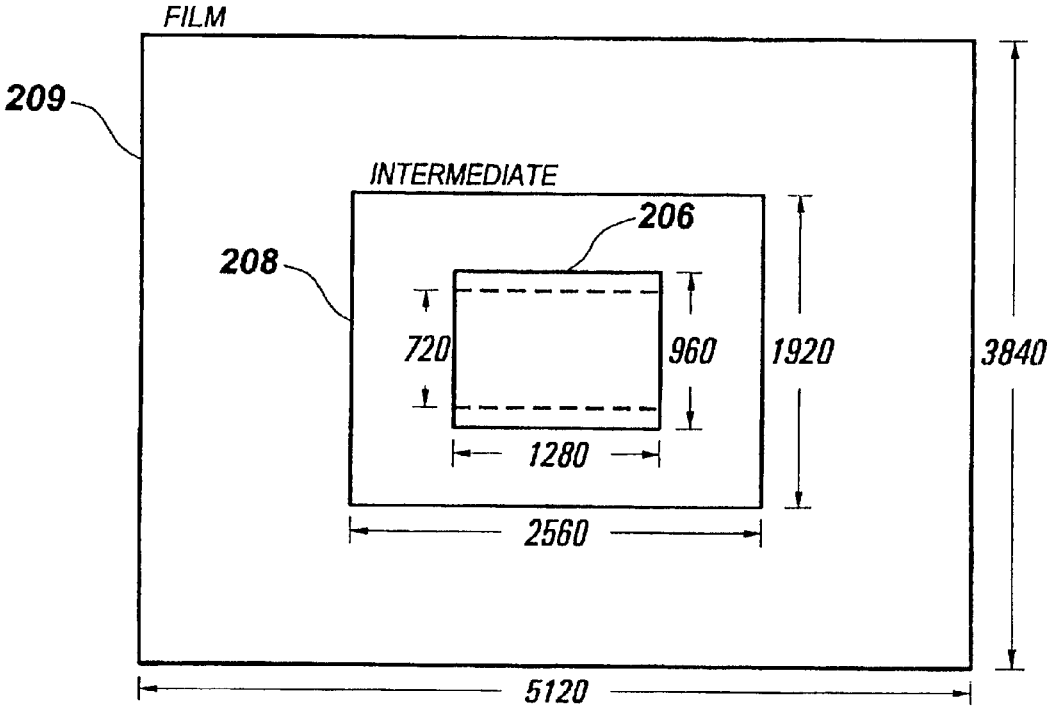

A further alternative embodiment of the invention is shown in FIG. 1D. As with the system described with reference to FIG. 1B, the user follows the technique commonly used in film production, wherein the film is exposed as a 4:3 aspect ratio image. When projected as a wide-screen format image, the upper and lower areas of the frame area again blocked by an aperture plate, so that the image shows the desired aspect ratio (typically 1.85:1 or 1.66:1). For an original image format recorded at 24 frames per second, with 4:3 ratio and with pixel dimensions of 1280×960, all image manipulations preserve these dimensions. Complete compatibility with the existing formats results, with NTSC and PAL images produced directly from these images by rescaling, and the aforementioned wide-screen images are provided by excluding 120 rows of pixels from the top of the image and 120 rows of pixels from the bottom of the image, thereby resulting in the 1280×720 image size as described above. The data content of each of these frames is 0.87890625 Mpxls, and the data storage requirements disclosed above are affected accordingly.

Figure 2A:
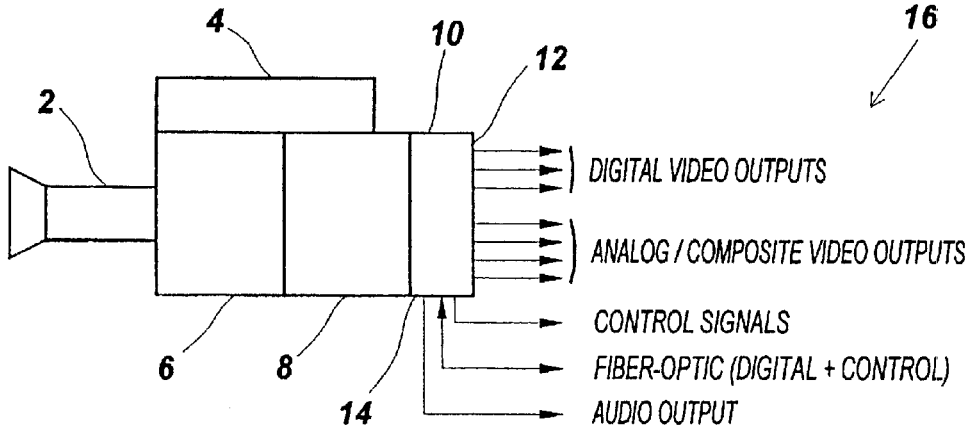
FIG. 2A shows the mechanical design for a digital camera configured to execute the preferred embodiment.

Currently available CCD elements for PAL/HDTV dual-use cameras provide 600,000 pixels, typically as arrays of 1024×592 or similar dimensions. By modifying the camera circuitry, the optical and CCD-driver circuitry may be adapted for use by the present invention, thereby allowing for economical implementation of the preferred configuration. FIG. 2A shows a camera as modified for this application. A lens 2 and viewfinder 4 are mounted upon the body of the camera frame. The usual optical-splitter, CCD-sensors and driver circuitry, and the inventive all-digital signal processing circuitry are located at 6, with optional battery-pack capability at 10. The various analog and digital output signals and any input audio, video or control signals, all shown generally at 16, are interfaced through appropriate connectors disposed on the rear-panel 12 and sub-panel 14. Provisions are included as shown for the input of analog audio signals, and for the output of both analog and digital audio signals. Preferably fiber-optic cabling is employed to carry the necessary signals. Internal video recording facilities 8 are described herein below.

Conventional CCD-element cameras of the type described above produce images of over 800 TV Lines horizontal Luminance (Y) resolution, with a sensitivity of 2,000 lux at f8, and with a signal-to-noise ratio of 62 dB. However, typical HDTV cameras, at 1,000 TV Lines resolution and with similar sensitivity, produce an image with only a 54 dB signal-to-noise ratio, due to the constraints of the wideband analog amplifiers and the smaller physical size of the CCD-pixel-elements. By employing the more conventional CCD-elements in the camera systems of this invention, and by relying upon the computer to create the HDTV-type image by image re-sizing, the improved signal-to-noise ratio is retained. In the practical implementation of cameras conforming to this new design approach, there will be less of a need for extensive lighting provisions, which in turn, means less demand upon the power generators in remote productions, and for AC-power in studio applications.

Figure 2B:
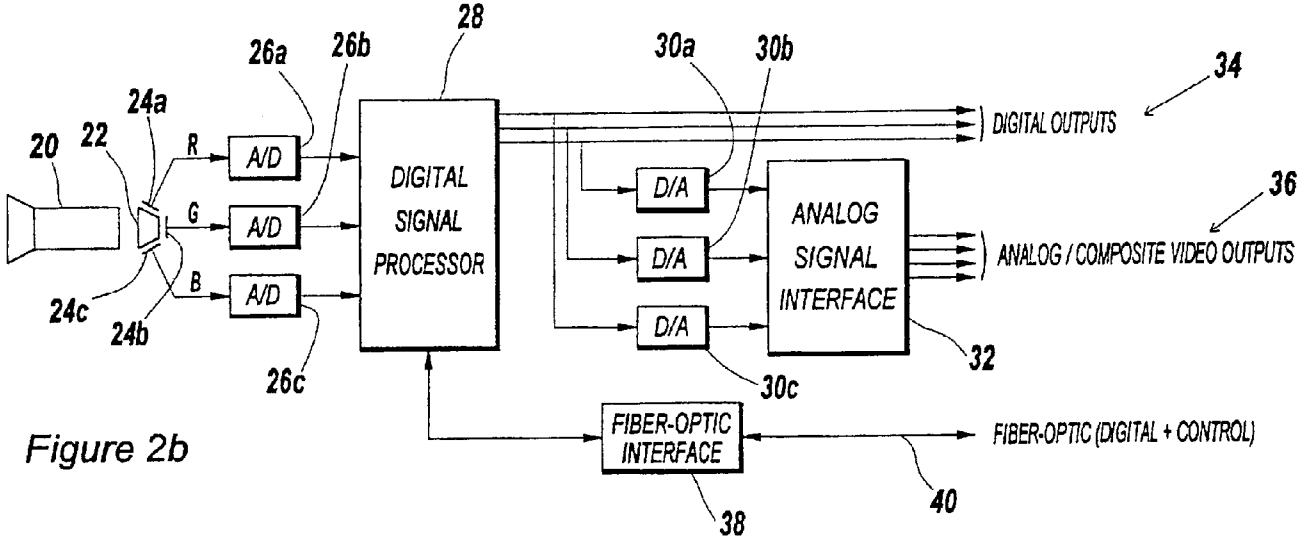
FIG. 2B shows a digital camera configured to execute the preferred embodiment for several different formats.

FIG. 2B shows the configuration of a digital video camera implementing the preferred embodiment of the invention. A lens assembly 20 is coupled to an optical beam-splitter 22, which focuses red, green and blue images onto CCD-elements 24a, 24b, and 24c, respectively. The output signals from each of these CCD-elements is directed to its respective analog-to-digital converter 26a, 26b, and 26c. The output of these three analog-to-digital converters is carried to digital signal processor 28, which provides digital signal outputs 34, configured as RGB, Y/R-Y/B-Y, YUV, YIQ, or any other format, as desired. In addition, these digital output signals are also provided to digital-to-analog converters 30a, 30b, and 30c, and from these converters to the analog signal processor 32. This processor provides the analog output signals 36 in the format desired, including the RGB, Y/R-Y/B-Y, YUV, YIQ, or other formats as described above, or additionally, in the composite video or Y/C formats commonly employed in conventional video production equipment and VTRs. A fiber-optic interface 38 accepts digital video signals from the digital signal processor 28 and provides these signals through the fiber-optic cable 40. Control signals are received from the fiber-optic cable 40 and carried through to the digital signal processor 28; other camera operational and status signals, such as tally signals, remote lens controls, return video signals, and so forth, are carried in the reverse direction along this same path from the digital signal processor 28, through the fiber-optic interface 38, to the fiber-optic cable 40.

In practice, the implementation of this design using three 600,000-element CCDs and the commonly employed technique of the spatial-shift for the green CCD-element (as described below) will produce Y/R-Y/B-Y signals with 800 TV lines of resolution, and will provide a luminance bandwidth of 15 MHz and a Chrominance bandwidth of 7.5 MHz. The RGB video signal outputs will provide a full 15 MHz bandwidth for each channel, and the camera will be suitable for the conventional/widescreen application described herein. However, for HDTV production, a higher performance level is desired. Accordingly, the system of FIG. 2B, as described above, is implemented with three of the latest 2.4 Mpxl CCD-elements, providing images of pixel dimension 2048×1152. In the digital realm, the resultant image is 6.75 MB per frame, and the data rate of 162 MB/sec is subjected to a 10:1 data-compression to 16.2 MB/sec for recording and production. The resulting image exhibits over 1,000 TV lines of resolution, again relying upon the spatial shift of the green CCD-element as described herein below. For Y/R-Y/B-Y signals, the Luminance bandwidth will be 60 MHz, and the Chrominance bandwidth will be 30 MHz. The RGB video signal outputs will provide a full 60 MHz bandwidth for each channel. In this case, it will be possible to re-size the picture image to be as large as 8192×4608, which would even enable the system to be used for special optical effects, or with other specialized film formats, such as IMAX and those employing 65 mm camera negatives.

Figure 2C:
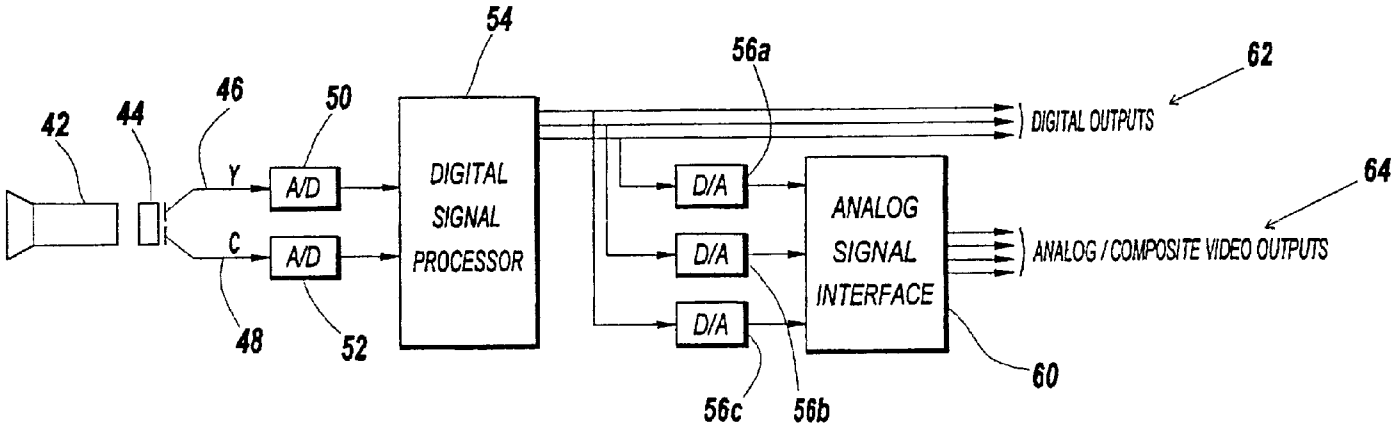
FIG. 2C shows a low-cost digital camera configured to execute the preferred embodiment for several different formats.

A more economical alternative implementation of the camera system is shown in FIG. 2C. In this case, the camera employs a single 1.2 Mpxl CCD-element, using color filters to produce the color signals. As shown, the camera lens assembly 42 is coupled to the color-filter assembly 44. The Luminance signal 46, and the Chrominance signals 48 are provided to the inputs of their respective analog-to-digital converters 50 and 52. The outputs of these converters are provided to the digital signal processor 54, which produces the digital video output signals 62. These signals may be in any of a number of alternative formats, including, for example, RGB, Y/R-Y/B-Y, YUV, or YIQ. These signals are additionally provided to digital-to-analog converters 56a, 56b, and 56c, respectively, and then to the analog signal processor 60, which provides analog output signals 64 in the format desired, including the RGB, Y/R-Y/B-Y, YUV, YIQ, or other formats as described above, or additionally in the composite video or Y/C formats commonly employed in conventional video production equipment and VTRs. In this case, the image size will be 1024×576 for the luminance channel (producing approximately 600 TV Lines of resolution), and 512×576 for each of the chrominance channels. In this case, it is not possible to introduce the green spatial-shift approach, because only a single CCD-element is employed. However, the luminance channel bandwidth achieved will be 15 MHz, and the chrominance channel bandwidth will be 7.5 MHz.

In CCD-based cameras, it is a common technique to increase the apparent resolution by mounting the red and blue CCD-elements in registration, but offsetting the green CCD-element by one-half pixel width horizontally. In this case, picture information is in-phase, but spurious information due to aliasing is out-of-phase. When the three color signals are mixed, the picture information is intact, but most of the alias information will be canceled out. This technique will evidently be less effective when objects are of solid colors, so it is still the usual practice to include low-pass optical filters mounted on each CCD-element to suppress the alias information. In addition, this technique cannot be applied to computer-based graphics, in which the pixel images for each color are always in registration. However, in general-use video, the result of the application of this spatial-shift offset is to raise the apparent luminance (Y) horizontal resolution to approximately 800 television lines.

The availability of hard-disk drives of progressively higher capacity and data transmission rates is allowing successively longer and higher resolution image displays in real-time. At the previously cited data rates, wide-screen frames would require 486 MB/min, so that currently available 10 GB disk drives will store more than 21 minutes of video. When the anticipated 100 GB disk drives (2.5-inch or 3.5-inch disks using Co-Cr, barium ferrite, or other high-density recording magnetic materials) become available, these units will store 210 minutes, or 3½ hours of video. For this application, a data storage unit 8 is provided to facilitate editing and production activities, and it is anticipated that these units would be employed in much the same way as video cassettes are currently used in Betacam and other electronic news gathering (ENG) cameras and in video productions. This data storage unit may be implemented by use of a magnetic, optical, or magneto-optical disk drive with removable storage media, or by a removable disk-drive unit, such as those based on the PCMCIA standards. Although PCMCIA media are 1.8-inches in dimension, alternative removable media storage units are not restricted to this limit, and could employ larger media, such as 2.5-inch or 3.5-inch disks; this, in turn, will lead to longer duration program data storage, or could be applied to lower ratios of data compression or higher-pixel-count images within the limits of the same size media.

Figure 3:
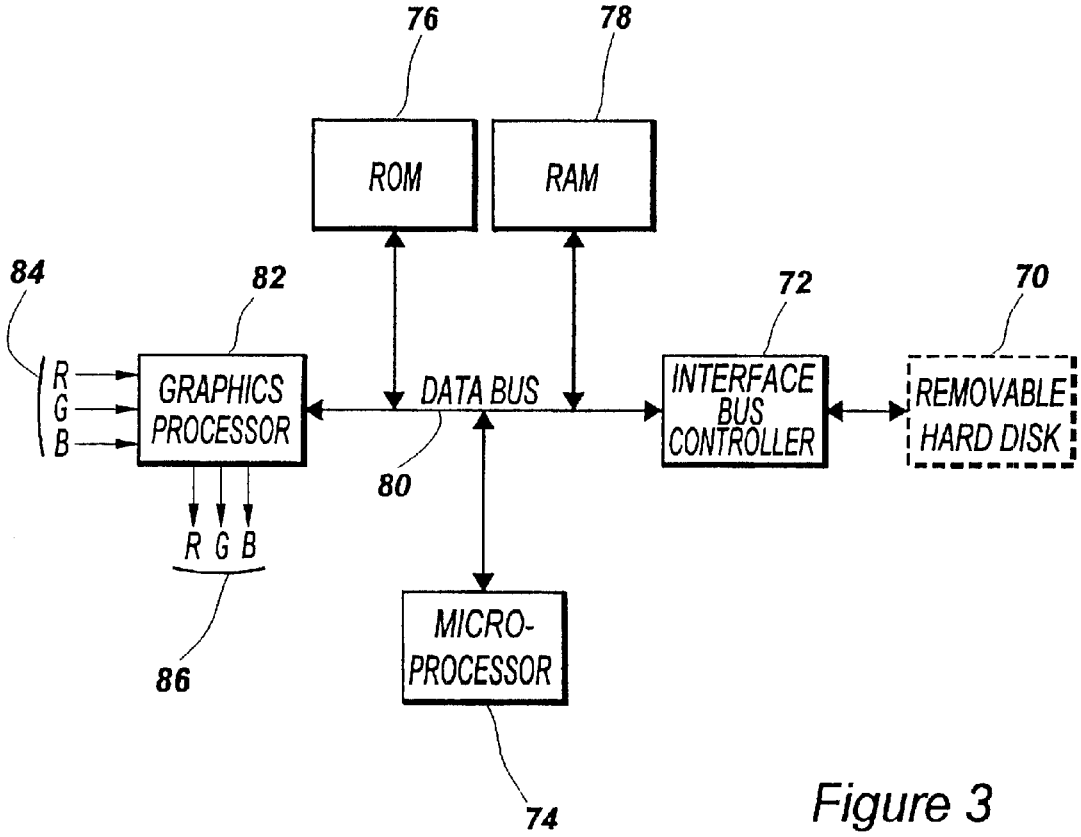
FIG. 3 shows a functional diagram for disk-based video recording.

FIG. 3 shows the functional diagram for the storage-device-based digital recorder employed in the video camera, or separately in editing and production facilities. As shown, a removable hard disk drive 70 is interfaced through a bus controller 72; in practice, alternative methods of storage such as optical or magneto-optical drives could be used, based on various interface bus standards such as SCSI-2 or PCMCIA. This disk drive system currently achieves data transfer rates of 20 MB/sec, and higher rates on these or other data storage devices, such as high-capacity removable memory modules, is anticipated. The microprocessor 74 controls the 64-bit or wider data bus 80, which integrates the various components. Currently available microprocessors include the Alpha 21064 by Digital Equipment Corporation, or the MIPS R4400 by MIPS Technologies, Inc.; future implementations would rely on the already announced P6 by Intel Corp. or the PowerPC 620, which is capable of sustained data transfer rates of 100 MB/sec. Up to 256 MB of ROM, shown at 76, is anticipated for operation, as is 256 MB or more of RAM, shown at 78. Current PC-based video production systems are equipped with at least 64 MB of RAM, to allow sophisticated editing effects. The graphics processor 82 represents dedicated hardware that performs the various manipulations required to process the input video signals 84 and the output video signals 86; although shown using an RGB format, either the inputs or outputs could be configured in alternative formats, such as Y/R-Y/B-Y, YIQ, YUV or other commonly used alternatives. In particular, while a software-based implementation of the processor 82 is possible, a hardware-based implementation preferred, with the system employing a compression ratio of 5:1 for the conventional/widescreen signals ("NTSC/PAL/Widescreen"), and a 10:1 compression ratio for HDTV signals (2048×1152, as described herein above). An example of one of the many available options for this data compression is the currently available Motion-JPEG system. Image re-sizing may alternatively be performed by dedicated microprocessors, such as the gm865×1 or gm833×3 by Genesis Microchip, Inc. Audio signals may be included within the data stream, as proposed in the several systems for digital television transmission already under evaluation by the Federal Communications Commission, or by one of the methods available for integrating audio and video signals used in multi-media recording schemes, such as the Microsoft ".AVI" (Audio/Video Interleave) file format. As an alternative, an independent system for recording audio signals may be implemented, either by employing separate digital recording provisions controlled by the same system and electronics, or by implementing completely separate equipment external to the camera system described herein above.

Figure 4:
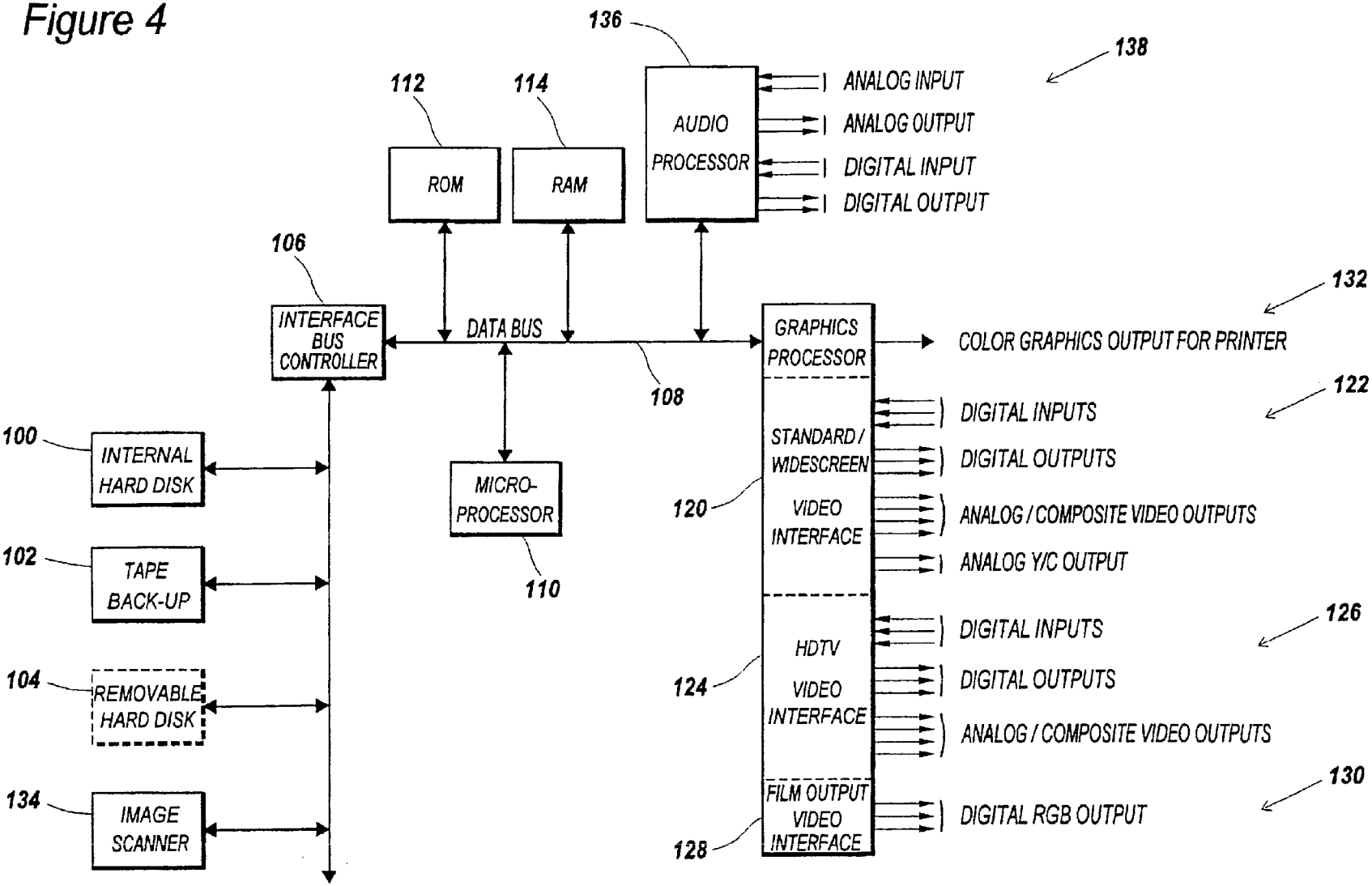
FIG. 4 shows the components comprising the multi-format audio/video production system.

FIG. 4 shows the components that comprise a multi-format audio/video production system. As in the case of the computer disk-based recording system of FIG. 3, an interface bus controller 106 provides access to a variety of storage devices, preferably including an internal hard-disk drive 100, a tape-back-up drive 102, and a hard-disk drive with removable media or a removable hard-disk drive 104. The interface bus standards implemented could include, among others, SCSI-2 or PCMCIA. Data is transmitted to and from these devices under control of microprocessor 110. Currently, data bus 108 would operate as shown as 64-bits wide, employing microprocessors such as those suggested for the computer-disk-based video recorder of FIG. 3; as higher-powered microprocessors become available, such as the PowerPC 620, the data bus may be widened to accommodate 128 bits, and the use of multiple parallel processors may be employed, with the anticipated goal of 1,000 MIPS per processor. Up to 256 MB of ROM 112 is anticipated to support the requisite software, and at least 1,024 MB of RAM 114 will allow for the sophisticated image manipulations, inter-frame interpolation, and intra-frame interpolation necessary for sophisticated production effects, and for conversions between the various image formats.

A key aspect of the system is the versatility of the graphics processor shown generally as 116. Eventually, dedicated hardware will allow the best performance for such operations as image manipulations and re-scaling, but it is not a requirement of the system that it assume these functions. Three separate sections are employed to process the three classifications of signals. Although the video input and output signals described herein below are shown, by example, as RGB, any alternative format for video signals, such as Y/R-Y/B-Y, YIQ, YUV, or other alternatives may be employed as part of the preferred embodiment. One possible physical implementation would be to create a separate circuit board for each of the sections as described below, and manufacture these boards so as to be compatible with existing or future PC-based electrical and physical interconnect standards.

A standard/widescreen video interface 120, intended to operate within the 1024×576 or 1024×768 image sizes, accepts digital RGB signals for processing and produces digital RGB outputs in these formats, as shown generally at 122. Conventional internal circuitry comprising D/A converters and associated analog amplifiers are employed to convert the internal images to a second set of outputs, including analog RGB signals and composite video signals. These outputs may optionally be supplied to either a conventional multi-scan computer video monitor or a conventional video monitor having input provisions for RGB signals (not shown). A third set of outputs supplies analog Y/C video signals. The graphics processor may be configured to accept or output these signals in the standard NTSC, PAL, or SECAM formats, and may additionally be utilized in other formats as employed in medical imaging or other specialized applications, or for any desired format for computer graphics applications. Conversion of these 24 frame-per-second images to the 30 fps (actually, 29.97 fps) NTSC and 25 fps PAL formats may be performed in a similar manner to that used for scanned film materials, that is to NTSC by using the conventional 3:2 "pull-down" field-sequence, or to PAL by running the images at the higher 25 fps rate. For other HDTV frame rates, aspect ratios, and line rates, intra-frame and inter-frame interpolation and image conversions may be performed by employing comparable techniques well known in the art of computer graphics and television.

The management of 25 fps (PAL-type) output signals in a system configured for 24 fps production applications presents technical issues which must be addressed, however. Simple playback of signals to produce PAL output is not a serious problem, since any stored video images may be replayed at any frame rate desired, and filmed material displayed at 25 fps is not objectionable. Indeed, this is the standard method for performing film-to-tape transfers used PAL- and SECAM-television countries. However, it is not practical to produce both PAL and NTSC signals concurrently from a single source running at 24 fps. Simultaneous output of both NTSC and film-rate images is performed by exploiting the 3:2 field-interleaving approach: 5×24=2×60; that is, two film frames are spread over five video fields. This makes it possible to concurrently produce film images at 24 fps and video images at 30 fps. The difference between 30 fps and the exact 29.97 fps rate of NTSC may be palliated by slightly modifying the system frame rate to 23.976 fps. This is not noticeable in normal film projection, and is an acceptable deviation from the normal film rate. However, if the system frame rate is adjusted to 25 fps to produce PAL or SECAM output, there is no convenient technique to produce 30 fps NTSC concurrently, unless multiple-frame storage with motion-interpolation is employed, which tends to create udesirable artifacts in the image produced. Commercial standards-converters are available to perform this function, however, from companies such as Snell & Wilcox.

This system is primarily directed towards production of video-based film and high-definition TV images, for which 24 fps and 30 fps, respectively, are the established frame rate for film and the proposed frame rate for HDTV (in NTSC-countries). The conversion to 25 fps is performed without difficulties in any application in which there is no requirement for the simultaneous production of images at other frame rates. Using this approach, the adjustment of frame rates for playback of the images by the system is sufficient for all of the normal production applications.

Figure 5:
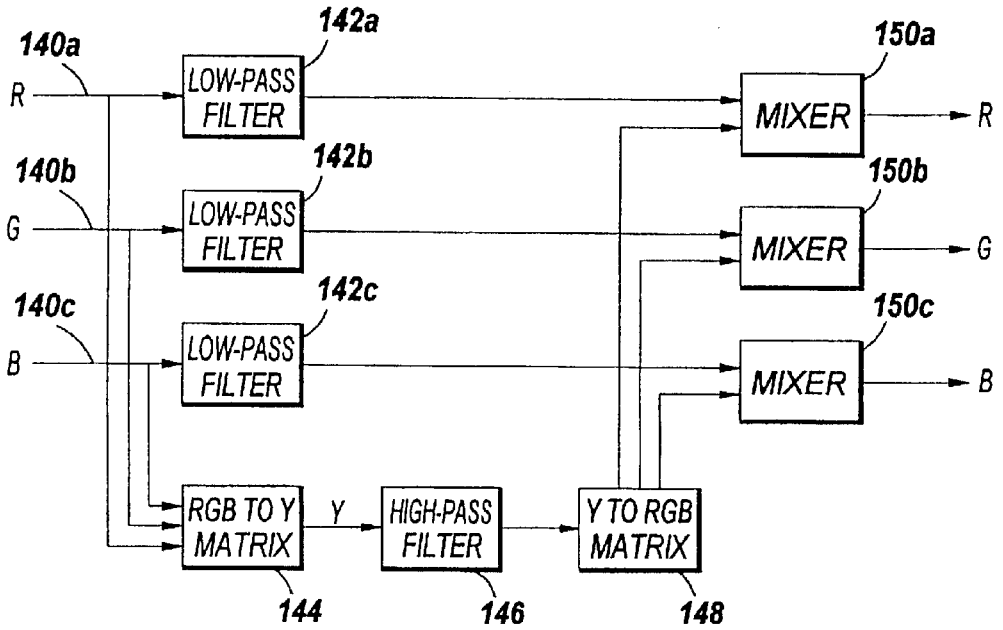
FIG. 5 depicts an approach for reducing the chrominance bandwidth of wide-band analog RGB output signals without decreasing the luminance resolution.

An HDTV video interface 124, intended to operate within the 2048×1152 or 2048×1536 image sizes (with re-sizing as necessary), accepts digital RGB (or alternative) signals for processing and produces digital outputs in the same image format, as shown generally at 126. As is the case for the Standard/Widescreen interface 120, conventional internal circuitry comprising D/A converters and associated analog amplifiers are employed to convert the internal images to a second set of outputs, for analog RGB signals and composite video signals. In normal practice, these outputs would have a full 15 MHz bandwidth for each of the three R, G, and B signals. However, by applying the technique shown in FIG. 5, it is possible to produce a signal having a 15 MHz luminance bandwidth, but only 7.5 MHz chrominance bandwidth. In effect, the circuitry shown simulates the results of applying a 4:2:2 sampling technique (as is commonly used in the Television Industry) without employing the step of creating the two chrominance components for sub-sampling, for example, I and Q for NTSC, U and V for PAL, or R-Y and B-Y. As shown, analog R, G, and B signals 140a, 140b, and 140c are supplied to low-pass filters 142a, 142b, and 142c, respectively, which are designed to remove frequencies above 7.5 MHz. In addition, these R, G, and B signals are applied to a standard RGB-to-Y matrix 144 to produce a standard luminance Y signal, which is carried to high-pass filter 146 which is designed to remove signal components below 7.5 MHz. This filtered luminance signal is then carried to a standard Y-to-RGB Matrix 148, in which the signal is proportionately split into R, G, and B components, and then supplied to mixers 150a, 150b, and 150c, wherein the luminance signal is mixed with R, G, and B signals from the three low-pass filters 142a, 142b, and 142c. The resulting analog R, G, and B outputs now have the full 15 MHz luminance bandwidth, but the chrominance bandwidth has been limited to 7.5 MHz. It is anticipated that different applications may require modification of the luminance bandwidth from 15 MHz, and of the chrominance bandwidth from 7.5 MHz, and the application of these techniques should be considered to be within the scope of this invention.

The third section of the graphics processor 116 shown in FIG. 4 is the film output video interface 128, which comprises a special set of video outputs 130 intended for use with devices such as laser film recorders. These outputs are preferably configured to provide a 4096×2304 or 4096×3072 image size from the image sizes employed internally, using re-sizing techniques discussed herein as necessary for the format conversions. Although 24 fps is the standard frame rate for film, some productions employ 30 fps, especially when used with NTSC materials, and these alternative frame rates, as well as alternative image sizes, are anticipated as suitable applications of the invention.

Several additional features of this system are disclosed in FIG. 4. The graphics processor includes a special output 132 for use with a color printer. In order to produce the highest quality prints from the screen display it is necessary to adjust the printer resolution to match the image resolution, and this is automatically optimized by the graphics processor for the various image sizes produced by the system. In addition, provisions are included for an image scanner 134, which may be implemented as a still image scanner or a film scanner, thereby enabling optical images to be integrated into the system. An optional audio processor 136 includes provisions for accepting audio signals in either analog or digital form, and outputting signals in either analog or digital form, as shown in the area generally designated as 138. For materials including audio intermixed with the video signals as described herein above, these signals are routed to the audio processor for editing effects and to provide an interface to other equipment.

It is important to note that although FIG. 4 shows only one set of each type of signal inputs, the system is capable of handling signals simultaneously from a plurality of sources and in a variety of formats. Depending on the performance level desired and the image sizes and frame rates of the signals, the system may be implemented with multiple hard disk units and bus controllers, and multiple graphics processors, thereby allowing integration of any combination of live camera signals, prerecorded materials, and scanned images. Improved data compression schemes and advances in hardware speed will allow progressively higher frame rates and image sizes to be manipulated in real-time.

Figure 6:
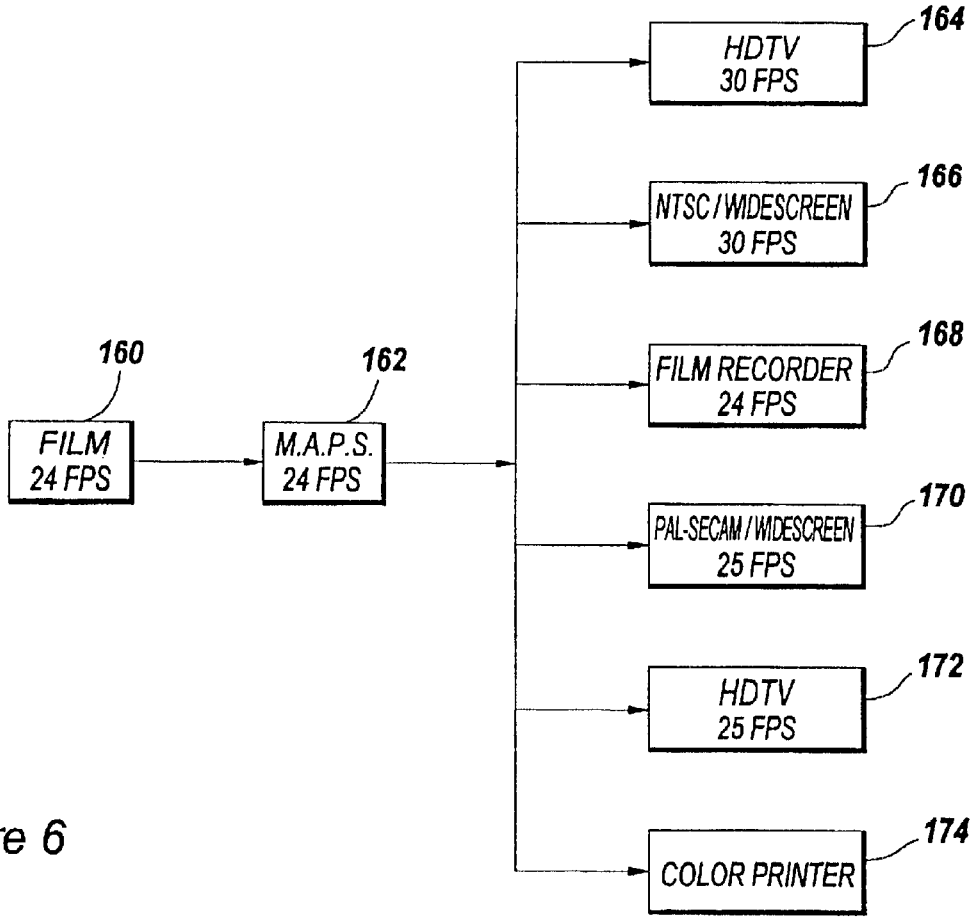
FIG. 6 shows the inter-relationship of the multi-format audio/video production system to many of the various existing and planned video formats.

FIG. 6 shows the inter-relationship of the various film and video formats compatible with the invention, though not intended to be inclusive of all possible implementations. In typical operations, the multi-format audio/video production system 162 would receive film-based elements 160 and combine them with locally produced materials already in the preferred internal format of 24 frames-per-second. In practice, materials May be converted from any other format including video at any frame rate or standard. After the production effects have been performed, the output signals may be configured for any use required, including, but not limited to, HDTV at 30 fps shown as 164, NTSC/widescreen at 30 fps shown as 166, PAL-SECAM/widescreen at 25 fps shown as 170, or HDTV at 25 fps shown as 172. In addition, output signals at 24 fps are available for use in a film-recording unit 168.

FIG. 1A shows the preferred family of aspect ratios and image frame sizes in pixels. The internal production storage format 180 has frame size 1024×576 with aspect ratio 16:9, and may be trimmed of side panels to use as a 768×576 image frame with aspect ratio of 4:3 in conventional television formats such as NTSC or PAL. After a 2:1 expansion/re-sizing, the HDTV format 182 is available, with frame size 2048×1152 and the same 16:9 aspect ratio. A further 2:1 expansion/re-sizing to the film format 184, with frame size 4096×2304 and the same 16:9 aspect ratio, allows for recording of film via currently available technology.

FIG. 1B shows an alternative family of aspect ratios and image frame sizes in pixels. The internal production storage format 190 has frame size 1024×768 with aspect ratio 4:3 as employed in conventional television formats such as NTSC, or PAL, and may be trimmed of top and bottom panels to use as a 1024×576 image frame with aspect ratio of 16:9. After a 2:1 expansion/resizing, the intermediate format 192 is available, with frame size 2048×1536 and the same 4:3 aspect ratio. A further 2:1 expansion/re-sizing to the alternative Film format 194, with frame size 4096×3072 and the same 4:3 aspect ratio, allows for recording of film via currently available technology.

FIG. 1C shows another alternative family of aspect ratios and image frame sizes in pixels, based on compatibility with several of the proposed digital HDTV formats. The internal production storage format 200 has frame size 1280×720 with aspect ratio 16:9, and may be trimmed of side panels to use as a 960×720 image frame with aspect ratio of 4:3 in conventional television formats such as NTSC or PAL. After a 2:1 expansion/re-sizing, the HDTV format 202 is available, with frame size 2560×1440 and the same 16:9 aspect ratio. A further 2:1 expansion/re-sizing to the film format 204, with frame size 5120×2880 and the same 16:9 aspect ratio, allows for recording of film via currently available technology.

FIG. 1D shows another alternative family of aspect ratios and image frame sizes in pixels. The internal production storage format 206 has frame size 1280×960 with aspect ratio 4:3 as employed in conventional television formats such as NTSC or PAL, and may be trimmed of top and bottom panels to use as a 1280×720 image frame with aspect ratio of 16:9. After a 2:1 expansion/re-sizing, the intermediate format 208 is available, sizing to the alternative film format 209, with frame size 5120×3840 and the same 4:3 aspect ratio, allows for recording of film via currently available technology.

Alternative implementations may employ different frame size (in pixels), aspect ratios, or frame rates, and these variations should be considered to be within the scope of the invention.

Figure 7:
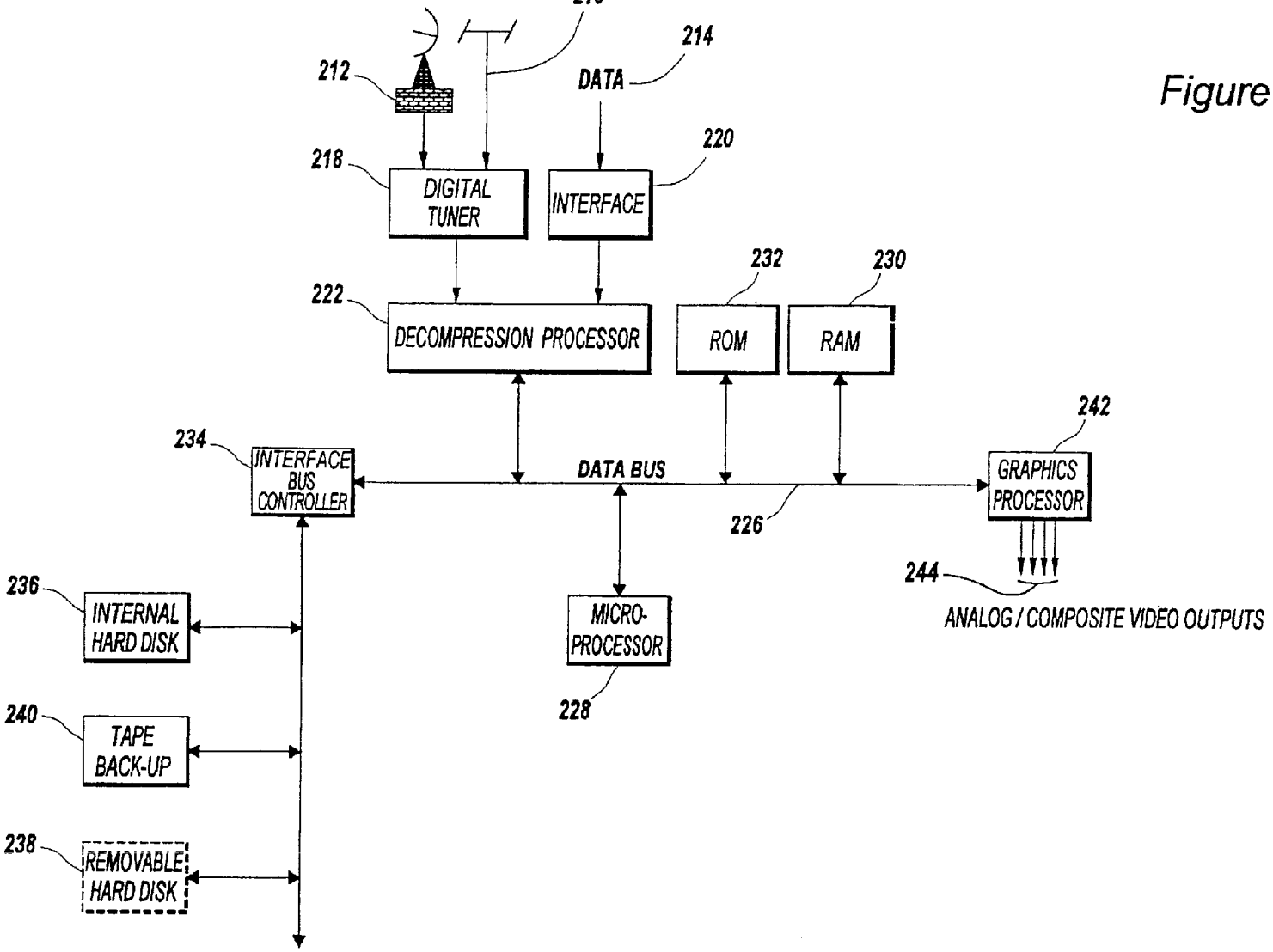
FIG. 7 shows the implementation of a complete television production system, based on one possible choice for image sizes and aspect ratios.

FIG. 7 shows an implementation involving one possible choice for image sizes, aspect ratios, and frame rates to provide a universal television production system. As shown, signals are provided from any of several sources, including conventional broadcast signals 210, satellite receivers 212, and interfaces to a high bandwidth data network 214. These signals would be provided to the digital tuner 218 and an appropriate adapter unit 220 for the data network or "information superhighway" before being supplied to the decompression processor 222. The processor 222 provides any necessary data de-compression and signal conditioning for the various signal sources, and preferably is implemented as a plug-in circuit board for a general-purpose computer, though the digital tuner 218 and the adapter 220 optionally may be included as part of the existing hardware.

The output of processor 222 is provided to the internal data bus 226. The system microprocessor 228 controls the data bus, and is provided with 16 to 64 MB of RAM 230 ad up to 64 Mb of ROM 232. This microprocessor could be implemented using one of the units previously described, such as the PowerPC 604 or PowerPC 620. A hard disk drive controller 234 provides access to various storage means, including, for example, an internal hard disk drive unit 236, a removable hard disk drive unit 238, or a tape drive 240; these storage units also enable the PC to function as a video recorder, as described above. A graphic processor 242, comprising dedicated hardware which optionally be implemented as a separate plug-in circuit board, performs the image manipulations required to convert between the various frame sizes (in pixels), aspect ratios, and frame rates. This graphics processor uses 16 to 32 MB of DRAM, and 2 to 8 MB of VRAM, depending on the type of display output desired. For frame size of 1280×720 with an aspect ratio 16:9, the lower range of DRAM and VRAM will be sufficient, but for a frame size of 2048×1152, the higher range of DRAM and VRAM is required. In general, the 1280×720 size is sufficient for conventional "multi-sync", computer display screens up to 20 inches, and the 2048×1152 size is appropriate for conventional "multi-sync" computer display screens up to 35 inches. Analog video outputs 244 are available for these various display units. Using this system, various formats may be displayed, including (for 25 fps, shown by speeding up 24 fps signals) 768×576 PAL/SECAM, 1024×576 wide-screen, and 2048×1152 HDTV, and (for 30 fps, shown by utilizing the well-known "3:2 pull-down" technique, and for 29.97 fps, shown by a slight slow-down in 30 fps signals) 640×480 NTSC and 854×480 wide-screen, and 1280×720 USA and 1920×1080 NHK (Japan) HDTV. While most NTSC monitors will synchronize to a 30 fps signal, possibly requiring that the color subcarrier frequency be adjusted, many PAL and SECAM monitors will not accept a 24 fps signal. In this case, more sophisticated frame-rate conversion techniques may be required for viewing live broadcasts, since the 24 fps input signal rate cannot keep pace with the 25 fps display rate. However, in practice it is anticipated that future television sets will incorporate "multi-sync" designs that eliminate this potential problem.

Having described the invention, we claim:

1. A multi-format audio/video production system adapted for use with a display device, comprising:

means to receive [an input] *a* signal representative of an [audio/video] *input* program *having audio and video components, and wherein the video component is received* in one of a plurality of display formats *without redundant frames or fields*;

a graphics processor connected to receive the [audio/video program] *audio and video components* and convert the display format of the *input* program into an intermediate production format[, the graphics processor including:] *having a frame rate of 24 or 25 frames per second (fps);*

[a standard/widescreen] *an* interface unit operative to convert the video program in the production format into [an output signal representative of a standard/widescreen formatted program, and a high-definition television (HDTV) interface unit operative to convert the video program in the production format into an output signal representative of an HDTV-formatted program;] *an output format;* high-capacity video storage means;

an operator interface; and a controller in operative communication with the means to receive the input signal, the graphics processor, the high-capacity video storage means and the operator interface, whereby commands entered by an operator through the interface cause the following functions to be performed:

(a) the conversions of [an audio/video] *the input* program into the production format, (b) storage of a program in the production format in the high-capacity video storage means, *and*

(c) the conversion of a program in the production format into a [standard/widescreen] program *in the output format*, either directly from the means to receive the input signal or from the high-capacity video storage means[, and (d) the conversion of a program in the production format into an HDTV program, either directly from the means to receive an input signal or from the high-capacity video storage means].

2. The multi-format audio/video production system of claim 1, the graphics processor further including a film output video interface, the controller further being operative, in response to a command entered by an operator, to convert the video program in the input format into an output signal for photographic production, either directly from the means to receive the input signal or from the high-capacity video storage means.

3. The multi-format audio/video production system of claim 1, including input and output signals compatible with any of the following standard formats: RGB, YIQ, YUV, and Y/R-Y/B-Y.

4. The multi-format audio/video production system of claim 1, including input and output signals compatible with a video standard utilizing separate luminance and chrominance component video signals.

5. The multi-format audio/video production system of claim 1, wherein the means to receive an input signal representative of a video program includes a digital video camera including:

a plurality of one or more image sensors;

an analog-to-digital converter circuit connected to the output of each image sensor to generate a digital signal representative of the sensed image; and a digital signal processor configured to receive the digital signal from each analog-to-digital converter circuit and generate a digital video output signal in a predetermined input format for processing by [one or more of the interface units comprising] the graphics processor.

6. The multi-format audio/video production system of claim 5, wherein the digital video camera uses two charge-coupled-device image sensors, one associated with luminance, the other associated with chrominance.

7. The multi-format audio/video production system of claim 1 wherein the means to receive a video program includes a removeable high-capacity magnetic storage medium.

8. The multi-format audio/video production system of claim 1 wherein, in the event that a change in aspect ratio results from [any of the format conversions] *a conversion*, the controller further is operative to cause the change in aspect ratio to be visibly evident on the display device.

9. The multi-format audio/video production system of claim 1 wherein the [graphics processor] *interface unit* is operative to convert a 24 frame-per-second *intermediate production* format [input signal] into a 30 frame-per-second NTSC-compatible format output signal.

10. The multi-format audio/video production system of claim 1 wherein the [graphics processor] *interface unit* is operative to convert a 24 frame-per-second *intermediate production* format [input signal] into a 25 frame-per-second PAL/SECAM-compatible format output signal.

11. The multi-format audio/video production system of claim 1 wherein the [graphics processor] *interface unit* is operative to convert a 24 frame-per-second *intermediate production* format [input signal] into an HDTV-compatible format output signal.

12. The multi/format audio/video production system of claim 1, including means to receive an RGB video signal having a chrominance bandwidth and a luminance bandwidth, and wherein the HDTV interface further provides means for reducing the chrominance bandwidth of the RGB video signal without reducing its luminance bandwidth, the HDTV interface including:

three low-pass filters, one associated with each of the R, G, and B components of the RGB video signal to remove all frequency components above a specified frequency;

an RGB-to-Y matrix circuit connected to receive each of the R, G, and B components, the RGB-to-Y matrix circuit being operative to combine the signals in predetermined proportions and produce a single luminance signal, Y;

a high-pass filter connected to the output of the RGB-to-Y matrix circuit to filter the Y signal to remove all frequency components below a specified frequency;

a Y-to-RGB matrix circuit connected to the output of the high-pass filter, the Y-to-RGB matrix circuit being operative to separate the high-pass-filtered Y signal into R', G' and B' components in the same proportion as previously combined by the RGB-to-Y matrix circuit;

three mixers, each adapted to receive an R/R', G/G' and B/B' pair, respectively, each mixer being operative to mix the signals of its respective input pairs and generate R", G" and B" signals having full luminance bandwidth and reduced chrominance bandwidth.

13. The multi-format audio/video production system of claim 1, the graphics processor further including means for transferring a program [into] *in* the intermediate production format to a remote location equipped with one or more of the interface units.

14. A multi-format audio/video production system [forming part of a general-purpose computer platform having a user] *configured for use with an operator* input and color display, the system comprising:

[means] *an input* to receive [an input] *a* video program [in one of a plurality of input formats] *having no added redundant frames or fields*;

*a removable* high-capacity video storage [means;] *medium; and*

[means] *a first video processor operative* to convert the [input] *video* program into [a 24 frames-per-second (fps)] *an intermediate* production format, [if not already in such a format] *having a frame rate of substantially 24 frames per second* (*fps*), for storage [within the high-capacity video storage means and for review on the color display] *on the removable medium*; and

[means] *a second video processor operative* to convert the *program in the intermediate* production format into one or more of the following output formats, either directly from the input or from [storage] *the removable medium*:

NTSC at *substantially* 30 fps,

PAL/SECAM at 25 fps,

HDTV at *24,* 25 *or substantially 30* fps, *and*

[HDTV at 30 fps, and]

film-compatible video at *substantially* 24 fps.

15. The multi-format audio/video production system of claim 14 wherein the means to convert the production format into one or more of the output formats includes interpolation means to expand the number of pixels associated with the production format.

[16. The multi-format audio/video production system of claim 14 wherein the means to convert the production version into one or more of the output formats includes image sequencing means to convert the 24 fps production format into a 30 fps output format.]

17. The multi-format audio/video production system of claim 14 wherein the means to convert the production format into one or more of the output formats includes means to increase the frame rate from the 24 fps production format frame rate to a 25 fps output frame rate.

18. The multi-format audio/video production system of claim 14, including output formats having the following image dimensions in pixels:

*720×480,*

*720×576,*

1024×576,

[1024×768,]

1280×720, and

[1080×960] *1920×1080*.

[19. The multi-format audio/video production system of claim 14 wherein the means to convert the production format into one or more of the output formats includes means to increase the frame rate from the 24 frames per second production frame to an output having a frame rate of substantially 30 frames per second.]

20. [In an enhanced personal computer having a color monitor, the] *A* method of [producing] *processing* a video program, comprising the steps of:

receiving an input [video] program *having an audio component and a video component without any added redundant frames or fields*;

converting the [input] video *component of the input* program into [a] *an internal* production format having a [predetermined] frame rate *of substantially 24 frames per second* (*fps*) and *an* image dimension in pixels, *when the program is not received in such a format*;

providing *a* high-capacity *digital audio*/video storage [means storing the program in the production format in the high-capacity storage means] *medium, and storing the program in the production format*;

[displaying the video program on the color monitor using the predetermined frame rate and image dimensions in pixels, including cropped versions of the program, with the extent of the cropping being visually evident on the monitor;]

accessing the program in the production format from the high-capacity storage [means] *medium;* and manipulating the program to create a desired [edited] version of the program in an output format[, including an output format] having a frame rate [and image dimensions in pixels different from that of the production format; and outputting the desired edited version of the program in the output format.] *greater than or equal to the frame rate of the production format.*

21. The method of claim 20, wherein the step of manipulating the video program to create a desired [edited] version of the program in a final format includes using an image-sequencing technique to convert from the production format at 24 frames per second to produce an edited version of the program in a final format at 30 frames per second.

22. The method of claim 20, wherein the step of manipulating the video program to create a desired [edited] version of the program in a final format includes the step of interpolating to produce an edited version of the program in a final format having pixel dimensions greater than that of the production format.

23. The method of claim 20, wherein the step of manipulating the video program to create a desired [edited] version of the program in a final format includes the step of increasing frame rate to produce an edited version of the program in a final format having a 25 frame-per-second rate.

24. The method of claim 20 wherein the step of manipulating the video program to create a desired edited version of the program in an output format includes creating a program having one of the following image dimensions in pixels:

*720×480,*

*720×576,*

1024×576,

[1024×768,]

1280×720, and

[1080×960.] *1920×1080.*

[25. The method of claim 20, wherein the step of converting the input video program into a production format includes converting the input video program into a production format characterized in having 24 frames per second.]

*26. The multi-format production system of claim 14, wherein the high-capacity video storage means is a magnetic-disc-based medium.*

*27. The multi-format production system of claim 14, wherein the high-capacity video storage means is an optical-disc-based medium.*

*28. The multi-format production system of claim 14, wherein the high-capacity video storage means is a magneto-optical-disc-based medium.*

*29. The multi-format production system of claim 14, wherein the high-capacity video storage means is a magnetic tape-based medium.*

*30. The multi-format production system of claim 14, wherein the high-capacity video storage means is a multiple frame rate of 24, 25 or 30 fps.*

*31. The method of claim 20, further including the step of viewing the desired version of the program in the output format at a location different from the one used to store the program on the high-capacity medium.*

*32. The multi-format production system of claim 1, wherein the interface unit is operative to convert the video program in the production format into an output format which is different from the format of the input program.*

*33. The multi-format production system of claim 14, wherein the first and second video processors are elements of the same graphics processor.*

*34. The multi-format production system of claim 14, wherein the first and second video processors are physically remote from one another.*

*35. The multi-format production system of claim 20, wherein the desired version of the program in the output format has an image dimension in pixels which is different from that of the production format.*

*36. The multi-format production system of claim 20, wherein the step of accessing the program in the production format occurs remotely from the step of converting the video component of the input program into the internal production format.*

*37. The multi-format production system of claim 20, wherein the step of providing a high-capacity digital audio/video storage medium includes providing a medium which is randomly accessible.*

* * * * *

UNITED STATES PATENT AND TRADEMARK OFFICE

CERTIFICATE OF CORRECTION

PATENT NO. : RE 38,079 E
DATED : April 15, 2003
INVENTOR(S) : Kinya Washino

It is certified that error appears in the above-identified patent and that said Letters Patent is hereby corrected as shown below:

Column 16,
Line 26, after "high-capacity" insert -- *digital audio*/ --.

Signed and Sealed this

Thirtieth Day of December, 2003

JAMES E. ROGAN
*Director of the United States Patent and Trademark Office*